Patented Feb. 25, 1941

2,232,868

UNITED STATES PATENT OFFICE 2,232,868

LUBRICATING OIL ADDITION PRODUCT AND METHOD OF MAKING THE SAME

Anthony E. Robertson, New York, N. Y., assignor to Standard Oil Development Company, a corporation of Delaware No Drawing. Application May 4, 1938,
Serial No. 205,975

12 Claims. (Cl. 196—78)

The present invention relates to improvements in dye or coloring matter for lubricating oil, greases and the like, and to an improved method for making the same.

The invention will be fully understood from the following description.

Lubricating oils are frequently colored with materials known as dyes. They are not strictly dyestuffs, but are principally used to give fluorescence or cast. The oil industry is very particular about the proper shades of color and attractive shades are extremely difficult to obtain. Most of the materials at the present time are produced from aromatic hydrocarbons or heavy residues which contain aromatic constituents. The materials are frequently difficultly soluble and tend to separate out on standing. They also tend to raise carbon residues of the oil and cause sludging to a certain extent.

It has been found that excellent dyestocks or rather coloring agents can be made from aliphatic hydrocarbons, especially from the low boiling materials which do not possess the objectionable features mentioned above. The constitution of the coloring agents is not fully understood and they may be of aromatic or condensed ring character, but the present agents differ nevertheless from the known dyes in that they are produced from the lower boiling aliphatic hydrocarbons, have an excellent color, are stable and not objectionable in lubricating compositions.

The new agents may be made from saturated aliphatic or olefinic hydrocarbons, but the olefins are preferred, particularly olefins obtained as polymers from the usual and iso olefins containing two to five carbon atoms, such as ethylene, propylene, and the butylenes, especially isobutylene or polymers produced by the copolymerization of different low boiling olefins. These polymers may be produced by the action of heat or catalysts such as sulfuric, phosphoric acids, clays, or aluminum chloride and equivalent Friedel-Craft or active halide catalysts.

The hydrocarbon used for producing the dye is preferably of the naphtha boiling range, that is to say boils below 400° F., and is heated in a bomb for a prolonged period, usually several hours with a phosphoric acid catalyst. The temperature is preferably slightly above 700° F., for example up to 750 and 760° F. excellent results are obtained, and temperatures as high as 800 or 850° F. may be used. The time of heating varies with the temperature and the particular catalyst used, but it is usually at least 2 hours, and may be from 8 to 10 hours. As to catalysts, they may be broadly described as acids of phosphorus and these comprise not only the acids of phosphorus, but likewise the oxides. Phosphoric acid itself may be used, but it is preferable to use phosphoric anhydride, $P_2O_5$, and in addition to these particular substances the pyro phosphates, meta phosphates may also be used. Phosphorous acids and anhydrides may be employed as well, but the phosphates are believed to be more desirable.

During reaction the bomb or vessel in which the reaction is brought about is thoroughly agitated and after reaction it is opened and the material is purified usually by filtering and by washing with water to remove traces of catalyst. The material may then be distilled to remove the lower boiling or lighter constituents, which may be reused, and to concentrate a residue which is the desired dye stock.

As an example of the dye and the method for its manufacture, the following may be considered:

A light naphtha boiling from about 158 to 320° F., and consisting mainly of saturated aliphatic hydrocarbons was selected as the raw material. About 1500 cc. of the naphtha were charged to a bomb along with 50 grams of $P_2O_5$. The bomb was heated to 730° F. and maintained at that temperature for about 5½ hours, during which time it was agitated by violent shaking. At the end of the reaction period the bomb was opened and the product filtered, washed with water, and then distilled up to about 400° F. The residue from the said distillation comprised 70 cc. of a fluid material of a dark green color. When 2% of this product was added to a light lubricating oil having color 16 Robinson, the oil then had a color of 5¾ Robinson. The product was quite stable, did not settle out on standing or fade. The oil containing the dye was heated for six hours at 250° F., and the color was found to drop only to 4½ Robinson, which is a very small decrease considering the severity of the test. The dye itself has an excellent shade both as to cast and color by transmitted light.

In another test 50 grams of $P_2O_5$ were added to and heated with 1,000 cc. of diisobutylene. The temperature during heating was 760° F. and heating was continued for a period of five hours. The dye was then recovered just as in the previous example. It was very similar to the above both in cast and color, was highly stable and showed only slight decrease in color on heating.

The present invention is not to be limited to any theory of the constitution of the dyestuff, nor to any particular catalyst, method or material from which it is made, but only to the following claims in which it is desired to claim all novelty inherent in the invention.

I claim:

1. A dye for lubricating oils prepared by prolonged heating a substantially aliphatic low boiling normally liquid hydrocarbon with phosphorus pentoxide in an amount between 4.5% and 7% by weight at temperatures between about 700° F. and 850° F.

2. Product according to claim 1 in which the dye is prepared from saturated naphtha by heating with $P_2O_5$.

3. Product according to claim 1 in which the dye is prepared from an unsaturated low boiling aliphatic hydrocarbon.

4. Product according to claim 1 in which the dye is prepared from a low boiling polymer of an olefin of two to five carbon atoms.

5. Product according to claim 1 in which the dye is prepared from a low boiling polymer of an iso-olefin of four to five carbon atoms.

6. Product according to claim 1 in which the substantially aliphatic low boiling normally liquid hydrocarbon is a saturated hydrocarbon.

7. Product according to claim 1 in which the dye is prepared from diisobutylene by heating in the presence of about 7% by weight of phosphorus pentoxide for a period of about 5 hours.

8. An improved process for producing a lubricating oil dye comprising heating a substantially aliphatic low boiling normally liquid saturated hydrocarbon at a temperature between 700 and 800° F. for a prolonged period in the presence of phosphorus pentoxide and then removing the catalyst and distilling the low boiling products so as to collect the residue as a dye.

9. A composition of matter comprising a product resulting from heating between 700° F. and 850° F. substantially aliphatic low boiling normally liquid saturated hydrocarbon in the presence of phosphorus pentoxide in an amount between 4.5% and 7% by weight, the said product being a viscous oil having a dark green color and soluble in lubricating oil to which it imparts an improved green cast when added thereto in small proportions.

10. A lubricating oil composition having desirable cast characteristics comprising a lubricating oil and a small amount of a cast-improving material prepared by prolonged heating of a substantially aliphatic low boiling normally liquid hydrocarbon with an oxide of phosphorus at a temperature between 700° F. and 850° F.

11. A lubricating oil composition having desirable cast characteristics comprising a lubricating oil and a small amount of a cast-improving material prepared by prolonged heating of a substantially aliphatic low boiling normally liquid hydrocarbon with phosphorus pentoxide in amount between 4.5% and 7% by weight at a temperature between about 700° F. and 850° F.

12. A new composition of matter comprising the product resulting from heating between about 700° F. and 850° F. a substantially aliphatic low boiling normally liquid saturated hydrocarbon with an acid of phosphorus which serves as a catalyst, said product being a viscous oil having dark green color and being soluble in lubricating oil to which it imparts an improved green cast when added thereto in small portions.

ANTHONY E. ROBERTSON.